United States Patent
Geinoz et al.

(10) Patent No.: US 11,719,469 B2
(45) Date of Patent: Aug. 8, 2023

(54) METHOD FOR THERMAL ENERGY TRANSMISSION USING WATER AND CARBON DIOXIDE

(71) Applicant: M.E.D. Energy Inc., Monsey, NY (US)

(72) Inventors: Francois Ignace Geinoz, Bulle (CH); Marcel Cueni, Bulle (CH); Kameran Yakob, Carouge (CH)

(73) Assignee: M.E.D. Energy Inc., Binghampton, NY (US)

( * ) Notice: Subject to any disclaimer, the term of this patent is extended or adjusted under 35 U.S.C. 154(b) by 0 days.

(21) Appl. No.: 17/683,588

(22) Filed: Mar. 1, 2022

(65) Prior Publication Data
US 2023/0029186 A1 Jan. 26, 2023

Related U.S. Application Data

(63) Continuation-in-part of application No. 16/663,954, filed on Oct. 25, 2019, now abandoned.

(51) Int. Cl.
*F25B 9/00* (2006.01)
*F25B 29/00* (2006.01)

(52) U.S. Cl.
CPC ............. *F25B 9/008* (2013.01); *F25B 9/006* (2013.01); *F25B 29/003* (2013.01); *F25B 2309/06* (2013.01)

(58) Field of Classification Search
None
See application file for complete search history.

(56) References Cited

U.S. PATENT DOCUMENTS

| | | | | |
|---|---|---|---|---|
| 3,890,787 A | * | 6/1975 | Margen | F24D 11/001 237/13 |
| 3,906,742 A | * | 9/1975 | Newton | F25D 16/00 62/332 |
| 3,910,345 A | * | 10/1975 | Whalen | F24F 3/08 165/100 |
| 8,833,475 B2 | * | 9/2014 | Saar | F24T 10/30 166/305.1 |
| 2005/0086958 A1 | * | 4/2005 | Walsh | F24F 11/52 62/201 |
| 2010/0018668 A1 | * | 1/2010 | Favrat | F24D 12/02 165/104.34 |
| 2013/0043678 A1 | * | 2/2013 | Saar | F02C 1/10 165/45 |
| 2018/0245800 A1 | * | 8/2018 | Darko | F24D 17/0036 |
| 2020/0096205 A1 | * | 3/2020 | Rosén | F24D 18/00 |

* cited by examiner

*Primary Examiner* — Avinash A Savani
*Assistant Examiner* — Deepak A Deean
(74) *Attorney, Agent, or Firm* — Cittone Demers & Arneri LLP; James P. Demers

(57) ABSTRACT

The invention provides a system for energy distribution that uses liquid carbon dioxide as a working fluid. Evaporation of the carbon dioxide provides cooling, and compression of the carbon dioxide gas back to the liquid state provides heat. The amount of heat transferred at both stages is sufficient to provide environmental heating and cooling. Waste thermal energy from a power plant, in the form of hot water, is fed into the system and used to drive the overall process. An underground thermal energy storage system is used to store energy flowing into the system that is in excess of the current demand.

2 Claims, 5 Drawing Sheets

METHOD FOR THERMAL ENERGY TRANSMISSION USING WATER AND CARBON DIOXIDE

RELATED APPLICATIONS

This application is a continuation-in-part of abandoned U.S. patent application Ser. No. 16/663,954 filed Oct. 25, 2019, which is incorporated herein by reference in its entirety.

FIELD OF THE INVENTION

The invention is in the general field of energy transmission and delivery. More particularly, the invention relates to co-transmission and co-delivery of both heating and cooling capacities on an as-needed basis.

BACKGROUND OF THE INVENTION

Generating stations for electricity production produce thermal energy in very large quantities. Depending on the nature of the fuel and the design of the plant, the thermal energy dissipated (co-generated) during the production of electrical energy may range from 35 to 65%. Although it is relatively easy to deliver the generated electricity to end consumers, it is much more difficult to deliver the co-generated thermal energy to potential consumers.

Thermal energy production by co-generation is not readily matched with demand, because it is a function of electricity production, and it is difficult to store thermal energy in commercially significant quantities. Furthermore, thermal energy losses are considerable during transmission, particularly in the case of remote destinations where losses can exceed 50% of the energy produced. Energy losses can be reduced with effective insulation, but the cost of such insulation increases more rapidly than its effectiveness. For these reasons, the delivery of centrally-generated thermal energy is largely restricted to dense urban areas, such as New York City and Chicago, where the local electric utility can economically deliver co-generated steam to customers via underground piping.

Customers requiring cooling can use steam to power vapor compression or absorption refrigeration chillers, but these are economical only for the large-scale installations found in office towers and apartment buildings. Smaller residential and commercial customers rely on the electrical grid to power vapor-compression air conditioners, and in very hot weather this can strain the local grid to the point of managed brownouts or unplanned failure. A method of distributing chilled water, known as district cooling, is possible where lake, river or sea water is available as a heat sink, but it requires installation of a second, parallel distribution system for delivery of the chilled water.

Given the above difficulties, there remains a need for an economical and efficient method of transmitting co-generated thermal energy, particularly over long distances.

BRIEF DESCRIPTION OF THE INVENTION

This invention overcomes the above-mentioned disadvantages by producing, transmitting and delivering to end-users a supply of thermal energy using moderately heated water as a heat carrier, and another fluid carrying mechanical energy transformable into thermal energy—liquid carbon dioxide under high pressure, in the order of 50 atmospheres—for cold production and inversely transformable into mechanical energy for heat production.

To obtain cooling, the end user allows the liquid carbon dioxide to evaporate, thereby removing from a local heat exchanger the heat of vaporization of the carbon dioxide. Adiabatic expansion of the gas can be used to obtain further cooling.

The expanded gas is then warmed by the heated water. To obtain heat, the end user adiabatically compresses, liquefies and cools the warmed gas, and the generated heat is provided to a heat exchanger. The carbon dioxide is returned to the system. In a preferred embodiment of the invention, these processes are supplemented by energy that is retrieved from an in-ground thermal energy storage system and delivered by the circulating water.

Under pressure, carbon dioxide can remain in the liquid state at moderate temperatures below the critical temperature of 31° C. The pressure is preferably such that the carbon dioxide remains liquid in the temperature range of 4° C. to 15° C., which corresponds to the average temperature of most soils in the world below a depth of 1.5 meters. Under these conditions, the liquid carbon dioxide is capable of being transported by underground pipe over long distances, with energy losses limited to the pumping required to compensate for pressure drops over distance. At its destination, expansion of the carbon dioxide provides both mechanical energy and cooling.

The water that carries the bulk of the thermal energy is maintained at its working temperature by thermal exchange with the surrounding soil, which, once heated, serves as a high-capacity energy storage medium. The system of the invention allows a high percentage of the thermal co-generated thermal energy to be supplied to end customers a la carte, i.e., according to consumer demand for cooling and/or heating, over considerably longer distances than are practical with prior art steam distribution systems.

DETAILED DESCRIPTION OF THE INVENTION

Figure 1:
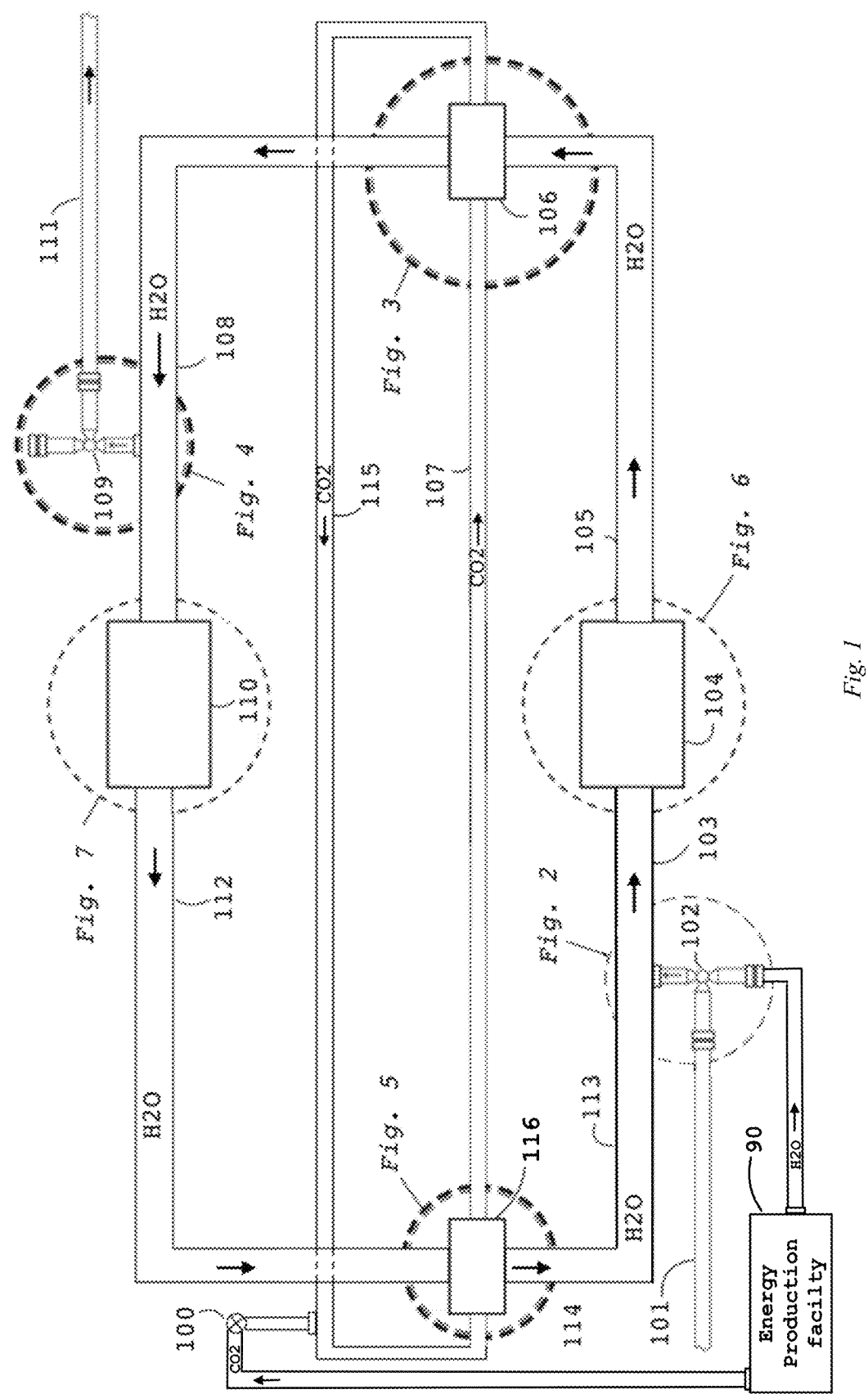
FIG. 1 shows an overall view of a distribution system of the invention.

The process of the invention begins at an energy production facility where electrical and thermal energy are co-generated. The facility is preferably a waste-to-energy conversion plant, in which pyrolysis or gasification of waste is carried out at high temperatures and pressures, so that carbon dioxide at an intermediate or high pressure is directly available from the conversion process itself. An incinerator or other combustion-based plant can be used if it is provided with carbon dioxide capture, or with an external supply of carbon dioxide. Power required to compress the carbon dioxide to a liquid state is preferably supplied by the electrical output of the plant, with heat released by the compression and liquefication contributing to the co-generated thermal output.

The transport of the carbon dioxide to the end users is carried out via pipe, with the carbon dioxide in liquid form at a density of about 763 kg/m$^3$.at room temperature. This is over 400 times higher than the density of carbon dioxide under normal conditions, (NTP, 20° C. and 1 bar), which is 1.80 kg/m$^3$. The pipe is preferably buried underground, at a depth of at least 1.5 m, and preferably 2.0 m or more. The piping, at this depth, will usually require little or no insulation, at least where ambient soil temperature maintains a temperature of 4° C. to 15° C.; this is the case in most developed areas of the world. A pressure sufficient to maintain the boiling point of carbon dioxide below that range (ca. 50 atm at 15° C.) is maintained throughout the carbon dioxide piping system. The piping is preferably of a relatively small diameter (10 cm or less), in view of the need to reliably and cost-effectively contain the carbon dioxide at such pressures. The pressure, which is on the order of 50 atm, can be varied to accommodate the local soil temperature, and seasonally adjusted if necessary. "Hot spots", e.g. where the piping is exposed to the sun or is not at its full running depth, may be provided with insulation and/or cooling.

Depending on its design, a 5 MW electricity generating plant will also produce on the order of 2.5 MW of thermal energy, which in the present invention is carried off as hot water in an insulated pipe. Piping having a diameter of ca. 250 mm is sufficient to carry this load. Because the water is at a moderate temperature (30° C. to 90° C.), the level of insulation is far less than what is required for steam distribution.

The mechanical energy transported by a 100 mm pipe filled with liquid carbon dioxide at 50 atm, and circulating at 10-20 l/s at full capacity, is about 4 MW. Ten l/s of liquid carbon dioxide corresponds to the production of carbon dioxide in a power plant of about 50 MW.

It should be noted that the energy production facility, the means for producing liquid carbon dioxide and hot water, and the piping systems that deliver the liquid carbon dioxide and hot water to the illustrated systems, form no part of the present invention.

Carbon dioxide that is not disposed of at the site of energy consumption is recirculated within the system of the invention. Due to the retention of a majority of the carbon dioxide within the carbon dioxide loop, a full load of stored mechanical energy may be maintained regardless of the power plant's capacity.

The invention, overall, provides a system for distributing thermal energy from the energy production facility to a site of a customer in need of heating and cooling. The system comprises at least the following elements:

A carbon dioxide pipe configured to deliver liquid carbon dioxide at a temperature between about 4° C. and about 15° C., under a pressure sufficient to maintain the carbon dioxide in a liquid state at that temperature, to the site, and a hot water pipe configured to deliver hot water at a temperature of at least 30° C. to the site.

A ground source heat pump (GSHP) system comprising two portions, the first portion being operatively connected to and accepting water from the hot water pipe, and being operatively connected to and delivering water to a carbon dioxide injector. The first portion of the GSHP cools the incoming water and stores the rejected heat in the ground.

A carbon dioxide evaporator for evaporating the liquid carbon dioxide to carbon dioxide gas, which is operatively connected to the carbon dioxide injector, and which is in thermal contact with a first heat exchanger. This first heat exchanger provides cooling at the site, by circulating a heat transfer fluid (typically water) that is cooled by the evaporation of the carbon dioxide.

A carbon dioxide injector, operatively connected to and accepting water from the first portion of the GSHP system, configured to contact the carbon dioxide gas from the evaporator with the accepted water. This produces a flow of cooled, carbonated water, which is delivered to the second portion of the GSHP system. The second portion of the GSHP system warms the cooled water, using heat from the ground. At least a portion of this heat is provided by the first portion of the GSHP, which is preferably buried in proximity.

The second portion of the GSHP is operatively connected to and delivers warmed water to gas separation chamber. The gas separation chamber is configured to remove carbon dioxide gas from the water delivered by the second portion of the GSHP, and is operatively connected to and delivers the separated carbon dioxide gas to a compressor.

The compressor is adapted to compress and condense the separated carbon dioxide to a liquid, under a pressure sufficient to maintain the carbon dioxide in a liquid state at a temperature between about 4° C. and about 15° C.

A second heat exchanger is in thermal contact with the compressor. This second heat exchanger provides heating at the site, by circulating a heat transfer fluid (typically water) that is warmed by heat rejected during the compression of the carbon dioxide.

Turning to the drawings, the operation of one embodiment of the system of the invention is now described. FIG. 1 is an overall schematic of a water loop of the system. The water loop comprises pipe sections 105, 108, 113 and 115, which deliver water to and carry water from the various elements of the water loop. The water loop further comprises first heat exchanger 104, carbon dioxide injector 106, second heat exchanger 110 and carbon dioxide recovery unit 116. In order to move water through the system, the loop further comprises one or more pumps, not shown, which the practitioner may install wherever convenience dictates. Pump 304 (FIG. 3) is a representative example.

Suitable pumps include electrically-driven impeller and centrifugal pumps, which are well known in the art of water system construction for large buildings and industrial plants. By way of example, the Series 80 ITSC pumps from Bell & Gossett of Morton Grove, Ill. are suitable, and offer variable speed pumping to meet varying demands on the system. Multiple pumps installed in parallel may be employed if required by the scale of the installation.

Heat exchangers 104 and 110 are ground-coupled heat exchangers. These are underground heat exchangers that capture heat from and/or dissipate heat to the soil in which they are embedded. Such in-ground heat exchangers are well-known heat transfer devices, commonly used in ground source heat pump (GSHP) systems. The exchangers use the Earth's near-constant subterranean temperature to warm (at 110) or cool (at 104) the water in the water loop. GSHP systems are frequently employed as components of seasonal thermal energy storage (STES) systems, which alternately heat and cool the soil on a seasonal cycle, and the GSHP components of an STES system may be employed with the present invention.

In the embodiments illustrated, heat exchanger 104 serves as the first portion of a ground source heat pump (GSHP) system configured and operated so as to cool the entering water to a temperature between about 4° C. and about 15°

C., and heat exchanger 110 serves as the second portion of a GSHP system configured and operated so as to warm the entering water to between about 4° C. and about 15° C.

Figure 6:
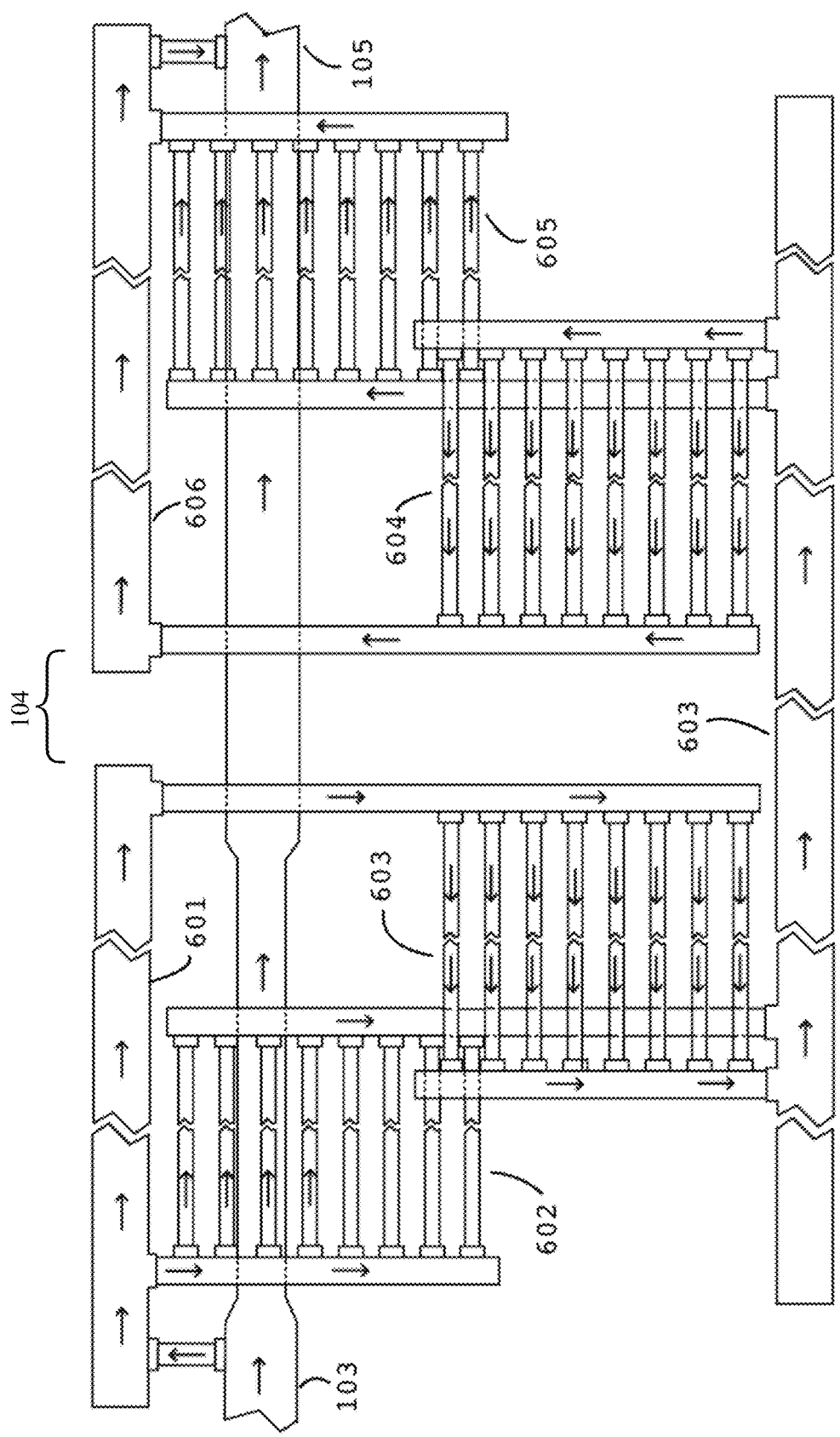
FIG. 6 shows a ground-coupled heat exchanger for incoming hot water.
Figure 7:
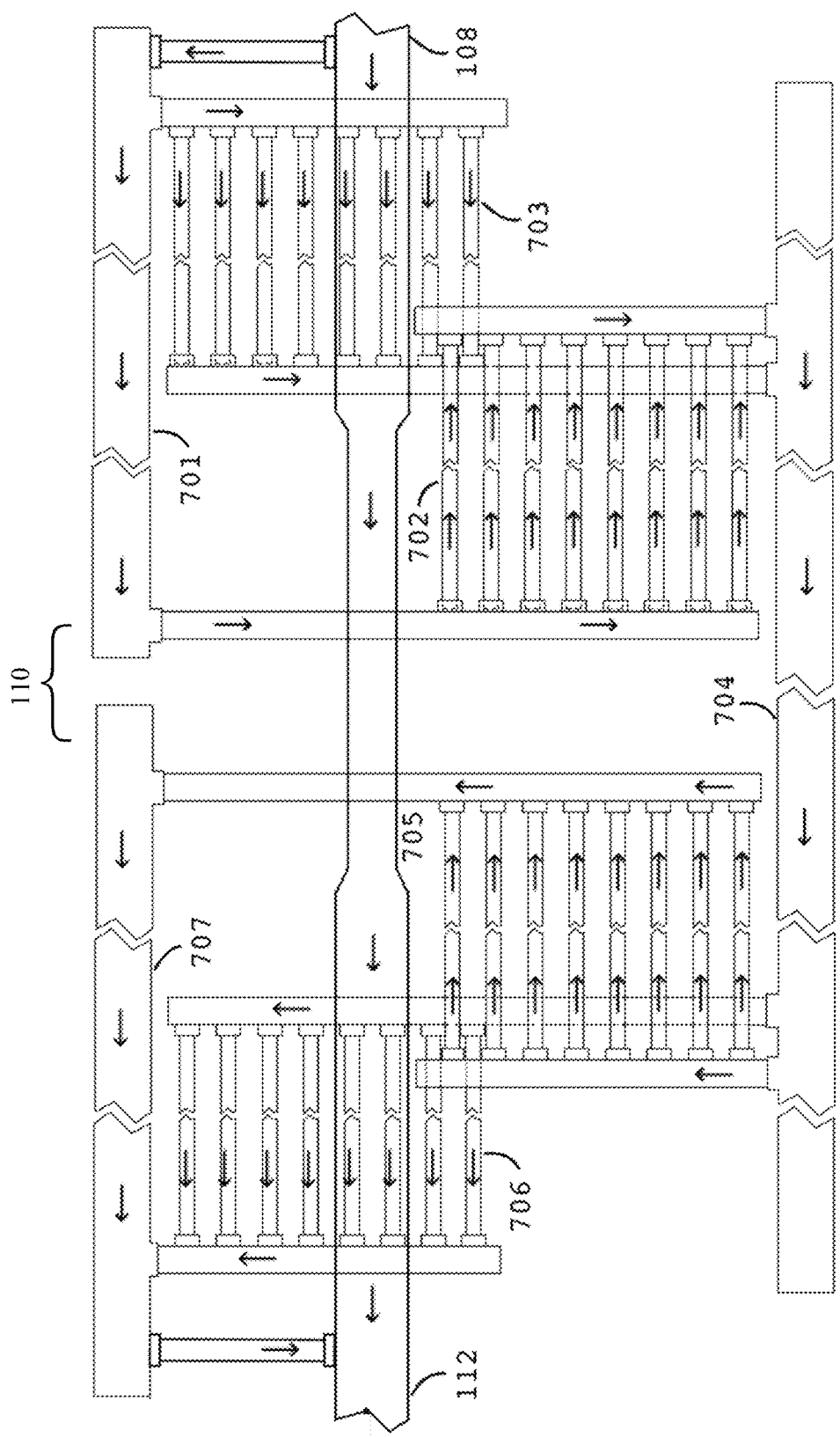
FIG. 7 shows a ground-coupled heat exchanger for cooled water.

The embodiments illustrated in FIGS. 6 and 7 employ straight pipes arranged in parallel, a traditional "radiator" arrangement which affords a large surface area with a relatively small pressure drop for a given flow rate. These pipes may be laid horizontally in the ground. If geology and/or climate make it preferable to store thermal energy in deeper ground, the heat exchanger pipes may be arranged vertically in boreholes. An exemplary borehole system is taught in U.S. Pat. No. 11,156,374 (incorporated herein by reference in its entirety.) Alternatives to straight pipes, designed to provide more rapid heat transfer, are known in the art and may be employed; representative examples may be found in U.S. Pat. No. 9,291,372 (incorporated herein by reference in its entirety.)

Further alternative embodiments may employ, for example, horizontal spiral coil-type (C. Li et al., *Appl. Therm. Eng.* 110:424-435 (2017) or so-called "slinky-type" exchangers (J.-S. Jeon et al., *Energy* 152:732-743 (2018).) Piping in these embodiments need not be metal, and polymeric tubing is generally preferred; typical installations employ polypropylene, or high density or crosslinked polyethylene. Extensive modeling studies have been carried out on the various structural options, and the published results and computational methods can be consulted to arrive at the optimum design for site-specific operating parameters, soil types, and soil temperatures (G. Hou et al., *Renewable and Sustainable Energy Rev.* 154:111830 (2022).)

Suitable carbon dioxide injectors 106 are known in the art of manufacturing carbonated beverages, and are articles of commerce. By way of example, the $CO_2$ saturator marketed by GEA Group AG of Büchen, Germany under the DICAR™ trademark, which is manufactured to scale as needed, may readily be adapted to the present use.

Suitable carbon dioxide recovery units 116 are known in the art of water treatment as decarbonators. Generally, the surface area of the incoming water is maximized by aerosolization, impingement of a water jet on a surface, or simply by flowing through a high-surface-area "contact bed" of a packing material, in the presence of a cross- or counterflow of air. The pH of the water may be optionally be maintained at 4.5 or less, so as to minimize bicarbonate concentration and maximize the proportion of molecular $CO_2$. Decarbonation towers such as those produced by DeLoach Industries, Inc. of Sarasota Fla. are readily adapted to use in the present invention. Operation of a commercial decarbonator at room temperature and atmospheric pressure can leave water with 5 ppm or less of residual $CO_2$, but in the present invention it is not necessary to minimize the $CO_2$ concentration, and the amount of air employed can be greatly reduced.

A number of water loops may be present along the length of the carbon dioxide and water pipelines that lead from the power plant. Each loop may serve a single apartment building, office building, or hospital, or an apartment complex or real estate development project, a shopping center, an office or industrial park, or an entire neighborhood or town if scaled appropriately.

Liquid carbon dioxide, under a pressure of about 50 atm, is metered into the system at 100. The liquid carbon dioxide flows in a $CO_2$ loop through pipes 107 and 115. Carbon dioxide is gradually lost through water outlet 111, as detailed below, and the amount metered in at 100 is adjusted to maintain the circulating volume and pressure of carbon dioxide in the $CO_2$ loop.

The warm water output of a previous loop, if any, enters at 101. Hot water from the power plant is metered into the loop at inlet connection chamber 102, and the combined flow is carried by pipe 103 to the first ground-coupled heat exchanger 104. Heat flows into the soil, which serves as a high-capacity reservoir for low-intensity thermal energy. Water exits the exchanger at 105 and feeds into carbon dioxide injector 106. Carbon dioxide at 50 atm enters the injector via pipe 107. The operation of the injector 106 is described below.

Water exits injector 106 via pipe 108, from which it may be drawn off at outlet connection chamber 109 and passed on via pipe 111 to the next loop in the line. Water not drawn off is fed to a second water-soil heat exchanger 110. The heat exchangers 104 and 110 may be located in proximity underground, so that the soil warmed by exchanger 104 may transfer heat back to the water in exchanger 110. The warmed water exits through pipe 112 and flows to the carbon dioxide recovery unit 116. Liquid carbon dioxide at 50 atm, from the energy production facility or from a previous loop, enters the recovery unit at 114. Operation of the recovery unit is described below. Carbon dioxide recovered by the unit is returned to the carbon dioxide pipe 107, and the water leaves via pipe 113 and returns to the first heat exchanger 104, completing the loop.

Figure 2:
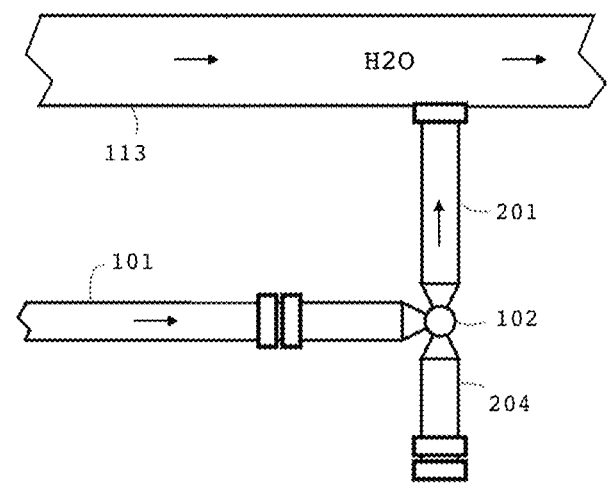
FIG. 2 shows an inlet connection chamber for entering water.

Turning to FIG. 2, the inlet connection chamber is shown in enlarged form. Inlet 204 carries hot water from the power plant, which is merged at chamber 102 with water from any previous loop, which is incoming through pipe 101. The merged flow, having been heated by the incoming hot water, preferably to a temperature in excess of 30° C., enters the pipe 113 through connector 201 and passes to ground-coupled heat exchanger 104 (FIG. 1), where it will warm the surrounding soil, which serves as the thermal energy storage for the loop.

Figure 3:
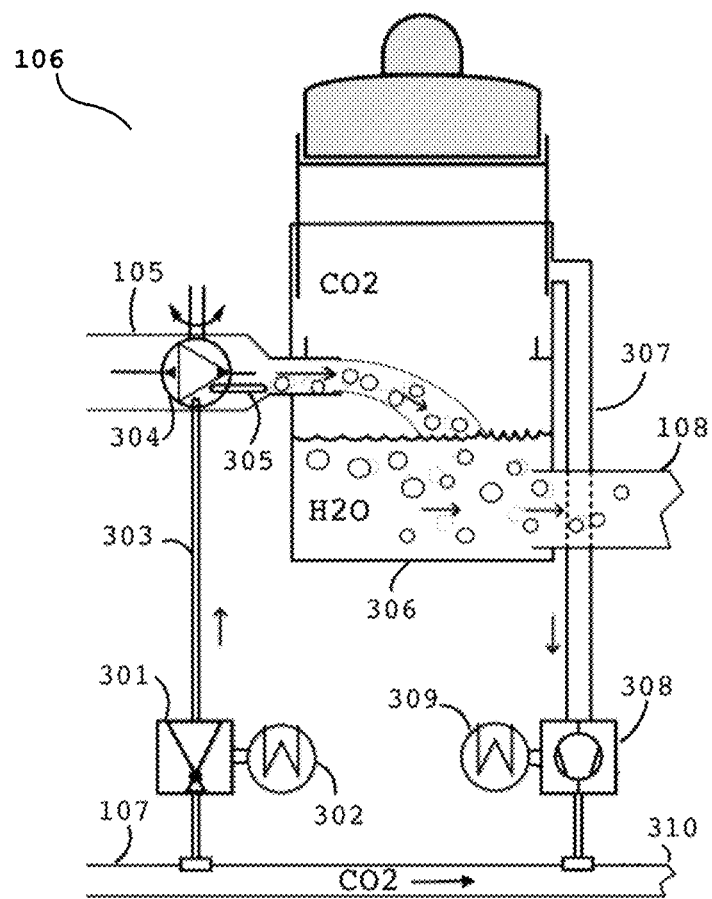
FIG. 3 shows a carbon dioxide injection chamber.

Turning to FIG. 3, the operation of the carbon dioxide injector will now be described. Water exiting the heat exchanger 104 (FIG. 1) at about 12° C. to 15° C. enters the injector at 105. A portion of the liquid carbon dioxide at 50 atm, carried by pipe 107, is vaporized through expansion chamber 301 and the expanding gas is delivered by pipe 303 to a water pump 304 before being injected at 305 into the water stream. The pump 304 contributes to the circulation of the water in the loop. The water and entrained carbon dioxide enter the phase separation chamber 106 where excess carbon dioxide is taken off through outlet 307. The carbon dioxide is compressed and liquefied by compressor 308 and returned to the pipe 107, before exiting at 310 and passing to return pipe 115.

The chamber 306 is maintained at a pressure of 1 to 2 atm, and the water that exits into pipe 108 will contain dissolved carbon dioxide at a concentration ranging from about 1 g/liter to about 3 g/liter, depending on the precise pressure and temperature.

The evaporation of the carbon dioxide in chamber 301 is accompanied by considerable cooling (the heat of vaporization of carbon dioxide is ca. 7700 J/mol at 50 atm.) Heat exchanger 302 provides the heat needed to maintain the evaporation rate, and the chilled heat transfer fluid is used to provide cooling to the users of the system, for example to cool a central air conditioning system. Conversely, at 308, the compression of the gas to 50 atm and subsequent liquefication releases a comparable amount of heat. Heat exchanger 309 recovers this heat for use in heating air and water for the users, and a portion of the energy used to power the compressor is thereby recovered and put to use (the remainder is stored as the heat of vaporization of the liquid carbon dioxide.) The largely adiabatic expansion of the carbon dioxide as it passes through the turbine at 304 is also accompanied by cooling, and the water exiting at 108 will be cooled accordingly, its thermal energy having thus been transferred to the carbon dioxide.

Figure 4:
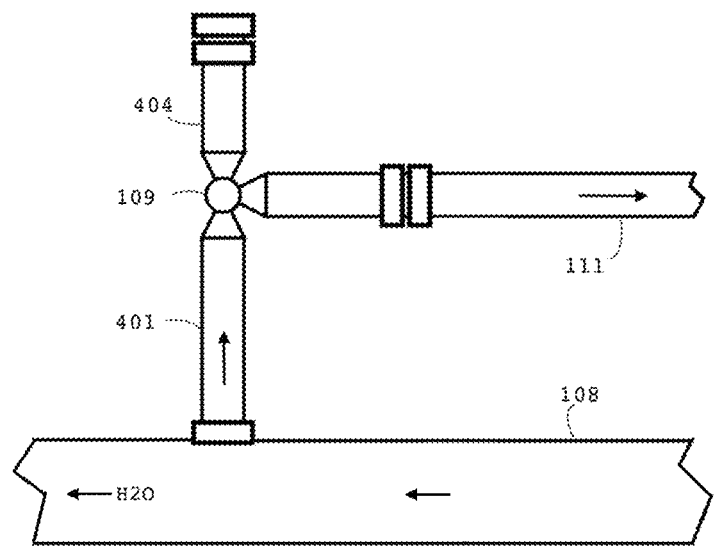
FIG. 4 shows an outlet connection chamber for discharged water.

Turning to FIG. 4, the outlet connection chamber is shown in greater detail. A portion of the carbonated, cooled water entering pipe 108 may be drawn off through connector 401 and delivered to the exit pipe 111 via connection chamber 109. The water not drawn off passes to ground-coupled heat exchanger 110, where it will be warmed back to the working temperature of about 12° C. to 15° C. by drawing heat from the soil, which has been warmed by ground-coupled heat exchanger 104.

Figure 5:
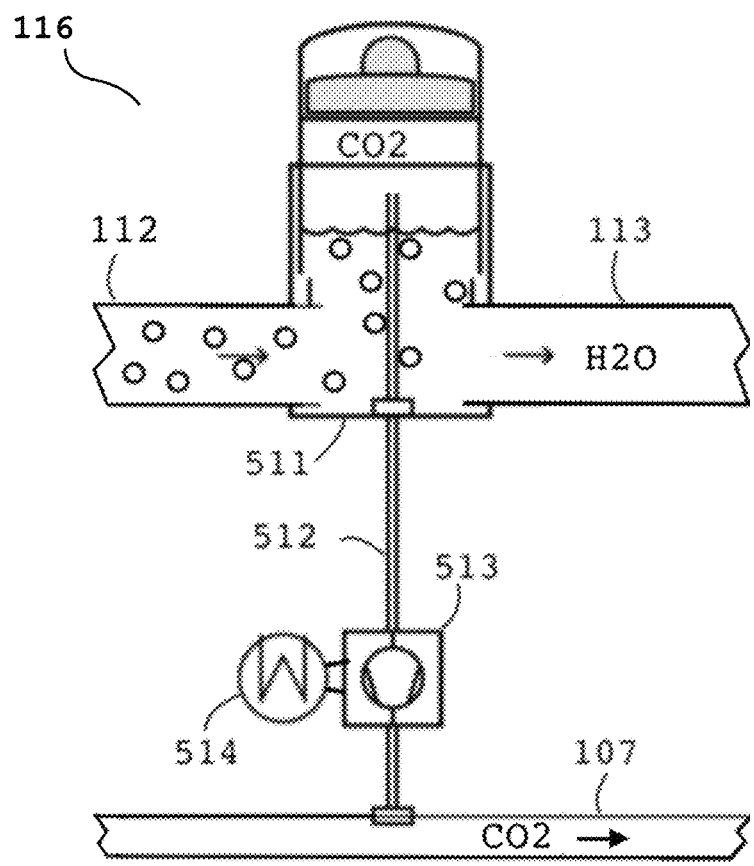
FIG. 5 shows an injection chamber coupled to a carbon dioxide recovery chamber.

Turning now to FIG. 5, a carbon dioxide recovery unit is shown in detail. The recovery unit serves to collect carbon dioxide bubbles that arise due to the warming of the carbonated water in heat exchanger 110. Undissolved $CO_2$ gas, if allowed to accumulate, could lead to cavitation and interfere with the operation of one or more pumps. Carbonated water flowing through pipe 112 enters gas separation chamber 511, where the gas and liquid phases separate. Separated carbon dioxide passes through pipe 512 to compressor 513, where it is compressed to about 50 atm and liquefied before being returned to carbon dioxide pipe 107. Heat released by the compression and condensation is recovered for use by heat exchanger 514. The water, now largely decarbonated, passes out through pipe 113 to be mixed with hot water from the power plant, before being returned to ground-coupled heat exchanger 104, thus completing the loop. The location of the chamber 511 is not critical, but high points, where gas is likely to accumulate, are preferable, and a number of chambers may be employed.

Gas separation chamber 511 may be a simple cylindrical container, as illustrated, in which gas and water are allowed to separate by gravity. Operation of compressor 513 in such an embodiment is regulated so as to maintain a functional liquid level within the chamber. In alternative embodiments, chamber 511 may be a centrifugal flow degasser such as is described in U.S. Pat. No. 5,240,477, which is incorporated by reference herein. These devices, which extract gas from the fluid under conditions of laminar flow, may be more suitable for high flow applications, where turbulent flow could prevent efficient operation of a simple gravity separator. Centrifugal or "swirl flow" degassers are commercially available, for example that marketed under the trade name VarioSpin™ by Krones AG of Neutraubling, Germany.

Turning to FIG. 6, a representative ground-coupled heat exchanger 104 is illustrated. Warm water enters at 103, and flows into manifold 601. When necessary, for example if the soil temperature is too warm for efficient heat transfer, water can be diverted directly to exit 105 by a valve (not shown). In the embodiment shown, two racks of heat exchange pipes 602 and 603 are embedded in and in effective thermal contact with the soil, at least 1.5 m but preferably at least 2.0 m below the surface. The depth will be appropriate to the climate where the system is installed. In this embodiment, water then flows to a second manifold 603, and then to a second set of heat exchange pipes 604 and 605, likewise embedded in the soil. Water exiting these pipes is collected by manifold 606 and directed to outlet 105.

Turning to FIG. 7, a similar representative ground-coupled heat exchanger 110 is shown. Cool water enters at 108, and flows into manifold 701. When necessary, water can be diverted directly to exit 112 by a valve (not shown). In the embodiment shown, two racks of heat exchange pipes 702 and 703 are embedded in and in effective thermal contact with the soil, at a depth appropriate to the climate where the system is installed. In this embodiment, water then flows to a second manifold 704, and then to a second set of heat exchange pipes 705 and 706, likewise embedded in the soil. Water exiting these pipes is collected by manifold 707 and directed to outlet 112.

The ground-coupled heat exchangers 104 and 110 are installed in close proximity underground, for maximum efficiency of heat transfer from one to the other. In a moderate climate they may be installed horizontally (parallel to the ground), while in extreme climates it may be desirable to install them vertically, to minimize exposure to excessively hot or cold soil, or else deeply enough to be insulated from surface temperature variations. These climate-dependent variations in design are well-known in the art.

It is expected that a plurality of loops according to FIG. 1 will be distributed along the length of the hot water and carbon dioxide pipelines. At the last such loop, the carbonated water effluent exiting at 111 is preferably directed to agricultural irrigation. Carbonated water can also be drawn off, if desired, at intermediate loops, limited only by the maximum flow rate of water through the system.

In particular, underground irrigation with carbonated water leads to direct uptake of the carbon dioxide by the irrigated plants, and atmospheric release of carbon dioxide is thereby reduced. An enhanced effect can be obtained within greenhouses. Significant improvements in crop growth have been demonstrated in tests of carbonated irrigation, but to date there has been no economical source of carbon dioxide at the necessary scale. The present invention can provide just such a source. Where the carbon dioxide used in the system is recovered from an oxidative electrical generation process, the net result is capture and at least partial sequestration, which is highly desirable as a means of mitigating anthropogenic climate change.

The entire system acts in some respects like a large vapor-compression refrigeration system, with R744 (carbon dioxide) as the working fluid. Heat is absorbed where the carbon dioxide evaporates, and heat is released where the carbon dioxide is compressed. Both heat flows generate temperature differentials useful for environmental heating and cooling. Energy delivered by the system is ultimately derived from hot water carrying waste heat from a power plant, and to a lesser extent from evaporation, expansion, and dissolution of the carbon dioxide, through which the energy used to compress and liquify the gas is recovered by the user. Because the temperatures at which the water is used are not extreme, insulation requirements are greatly reduced relative to, e.g., a steam distribution network, and the thermal energy is readily stored and released by means of underground thermal energy storage.

In alternative embodiments, where the appropriate local geology exists, an aquifer thermal energy storage system, a borehole thermal energy system, or any other form of ground source heat pump (GSHP) or seasonal thermal energy storage (STES) system can be employed in place of the soil thermal storage system illustrated. Relevant examples and design considerations may be found, for example, in the review article R. P. Cunha, P. J. Bourne-Webb, *Renewable and Sustainable Energy Reviews*, 158: 112072 (2022).

We claim:

1. A method for distributing energy from an energy production facility to a site of a customer in need of heating and cooling, comprising:

(a) providing, at the site, carbon dioxide in liquid form, at a temperature between about 4° C. and about 15° C., under a pressure sufficient to maintain the carbon dioxide in a liquid state at that temperature;

(b) providing, at the site, hot water at a temperature of at least 30° C., the hot water being produced at the energy production facility;

(c) evaporating the liquid carbon dioxide to carbon dioxide gas to provide cooling at the site;

(d) allowing the evaporated carbon dioxide to expand;

(e) warming the expanded carbon dioxide by contacting it with the hot water, wherein the expanded carbon dioxide is warmed by injecting it into the hot water; and (f) compressing, condensing and cooling at least a portion of the vaporized carbon dioxide to the conditions recited in step (a), and using the rejected heat to provide heating at the site;

(g) injecting the hot water into a water-filled loop, in which the water is being circulated around the loop; wherein the water within the loop (i) is warmed by the injected hot water;

(ii) passes through a first portion of a ground source heat pump (GSHP) system, the first portion being configured and operated so as to cool the water to a temperature between 4° C. and 15° C.;

(iii) is contacted with and cooled by the expanded carbon dioxide gas at step (e);

(iv) is separated from undissolved carbon dioxide gas;

(v) is partially discharged from the loop, at a rate equal to the rate of injection of the hot water;

(vi) passes through a second portion of the ground source heat pump (GSHP) system, the second portion being configured and operated so as to warm the water to between 4° C. and 15° C.; and (vii) is returned to step (i).

2. A system for distributing thermal energy from an energy production facility to a site of a customer in need of heating and cooling, comprising:

(a) a carbon dioxide pipe configured to deliver liquid carbon dioxide at a temperature between about 4° C. and about 15° C., under a pressure sufficient to maintain the carbon dioxide in a liquid state at that temperature, to the site;

(b) a hot water pipe configured to deliver hot water at a temperature of at least WC to the site;

(c) a first portion of a ground source heat pump (GSHP) system, operatively connected to and accepting water from the hot water pipe, and operatively connected to and delivering water to a carbon dioxide injector;

(d) a carbon dioxide evaporator for evaporating the liquid carbon dioxide to carbon dioxide gas, operatively connected to the carbon dioxide injector;

(e) a first heat exchanger in thermal contact with the carbon dioxide evaporator, which provides cooling at the site;

(f) the carbon dioxide injector being configured to contact the carbon dioxide gas from the evaporator with the water delivered by the first portion of the GSHP system;

(g) a second portion of the GSHP system, operatively connected to and accepting water from the carbon dioxide injector, and operatively connected to and delivering water to a gas separation chamber;

(h) the gas separation chamber being configured to remove carbon dioxide gas from the water delivered by the second portion of the GSHP, and operatively connected to and delivering carbon dioxide gas to a compressor;

(i) the compressor being adapted to condense the carbon dioxide to a liquid, under a pressure sufficient to maintain the carbon dioxide in a liquid state at a temperature between about 4° C. and about 15° C.; and (j) a second heat exchanger in thermal contact with the compressor, which provides heating at the site.

\* \* \* \* \*